(12) United States Patent
Corder

(10) Patent No.: US 6,399,181 B1
(45) Date of Patent: Jun. 4, 2002

(54) NON-SKID SURFACE STRUCTURE

(76) Inventor: Adrian C. Corder, 27327 Fahren Ct., Apt. 202, Canyon Country, CA (US) 91351

( * ) Notice: Subject to any disclaimer, the term of this patent is extended or adjusted under 35 U.S.C. 154(b) by 0 days.

(21) Appl. No.: 09/717,621

(22) Filed: Nov. 21, 2000

(51) Int. Cl.$^7$ .............................. B32B 31/00; B32B 5/16
(52) U.S. Cl. ........................ 428/143; 428/146; 428/149; 428/150; 428/413; 428/414; 428/492; 428/908.8; 428/323; 428/423; 404/32; 404/33; 427/180; 427/202; 427/408; 427/257; 427/267; 156/279; 156/278; 15/215
(58) Field of Search ................................. 428/143, 146, 428/149, 150, 413, 414, 492, 908.8, 323, 423; 404/32, 33; 427/180, 202, 408, 257, 267; 156/279, 278; 15/215

(56) References Cited

U.S. PATENT DOCUMENTS

| | | | | |
|---|---|---|---|---|
| 2,165,955 A | * | 7/1939 | Haarhoff | 156/279 |
| 2,336,235 A | * | 12/1943 | Fischer | 404/32 |
| 4,336,293 A | * | 6/1982 | Eiden | 156/209 |
| 4,361,614 A | * | 11/1982 | Moffitt, Jr. | 156/250 |
| 4,518,641 A | | 5/1985 | Shimmin | |
| 4,662,972 A | | 5/1987 | Thompson | |
| 4,737,390 A | * | 4/1988 | Fricano et al. | 114/85 |
| 4,973,505 A | * | 11/1990 | Bielous | 404/32 |
| 4,998,717 A | * | 3/1991 | Vaux | 272/3 |
| 5,110,657 A | * | 5/1992 | Ainslie | 427/186 |
| 5,266,378 A | | 11/1993 | Stephenson | |
| 5,281,481 A | | 1/1994 | Hayward | |
| 5,340,652 A | | 8/1994 | Sondhe | |
| 5,475,951 A | | 12/1995 | Litzow | |
| 5,500,267 A | | 3/1996 | Canning | |
| 5,763,070 A | | 6/1998 | Kerick | |
| 6,036,902 A | * | 3/2000 | Wang | 264/132 |
| 6,103,053 A | * | 8/2000 | Saylor, Jr. | 156/279 |

OTHER PUBLICATIONS

Material Safety Data Sheet, re SIKAGARD 62 HI BILD Part A all Colors/SIKAGARD 62 HI BILD Part B, by SIKA Coporation, Lyndhurst, JH, Dec. 24, 1989.

* cited by examiner

Primary Examiner—William P. Watkins, III
(74) Attorney, Agent, or Firm—Small Larkin, LLP

(57) ABSTRACT

A non-slip, water resistant, oil resistant surface structure for use where water and/or oil are likely to create a slippery surface, including a rubber-bottom mat upon which a thrice coated, non-slip surfaced substrate is fastened, the coating on the substrate including crushed walnuts, or the equivalent, to provide for a non-slip surface and the coating comprising a thermosetting epoxy resin material with an amine hardener.

10 Claims, 3 Drawing Sheets

NON-SKID SURFACE STRUCTURE

BACKGROUND OF THE INVENTION

A. Field of the Invention

The present invention is directed to a non-skid surface structure that can be used as a floor, or a mat adapted for placement on garage floors, and includes, preferably features that render it relatively water resistant, oil resistant and non-slip.

B. Description of the Prior Art

Various non-skid surface structures are known, as described, for example, in U.S. Pat. Nos. 4,662,972, 5,475, 951, 5,500,267 and 5,763,070. However, none of these structures provide the combination of features yielding the usefulness, flexibility, durability, ease of manufacture, and practicality of the present invention.

OBJECTS AND SUMMARY OF THE INVENTION

It is an object of the present invention to provide a non-slip, water resistant, oil resistant surface structure that can be used as a floor or as a mat for placement on garage floors and other flat surfaces where the presence of water and/or oil may create a slippery surface.

It is a further object of the present invention to provide a method of making a non-slip, water resistant and oil resistant surface structure that can be used as a floor or as a mat for placement on garage floors and other floor areas.

With reference to the above-described object, the present invention provides a surface structure that can be used as a floor or as a mat having a skid surface which is adapted for use on floors, stairs and other surfaces, as well as a method of for preparing such a mat.

The method of manufacture of the present surface structure includes coating a base material, preferably wood, with a thermosetting epoxy resin, and then placing a cloth which has been dipped in the epoxy resin material on the base material and allowing both to dry until the coating hardens. The coated, hardened base material is then coated with a third coating of the thermosetting epoxy resin, which third coat contains abrasive materials such as walnut shells or other granular materials and then allowing the third coating to dry and harden. The coated base, cloth dipped, granular coated substrate is then fastened to a conventional rubber-bottomed mat with an appropriate adhesive, such as "Gorilla Glue" and/or conventional fasteners. The size, depth, width, length and thickness of the surface structure may vary.

DESCRIPTION OF THE PREFERRED EMBODIMENTS

Figure 1:
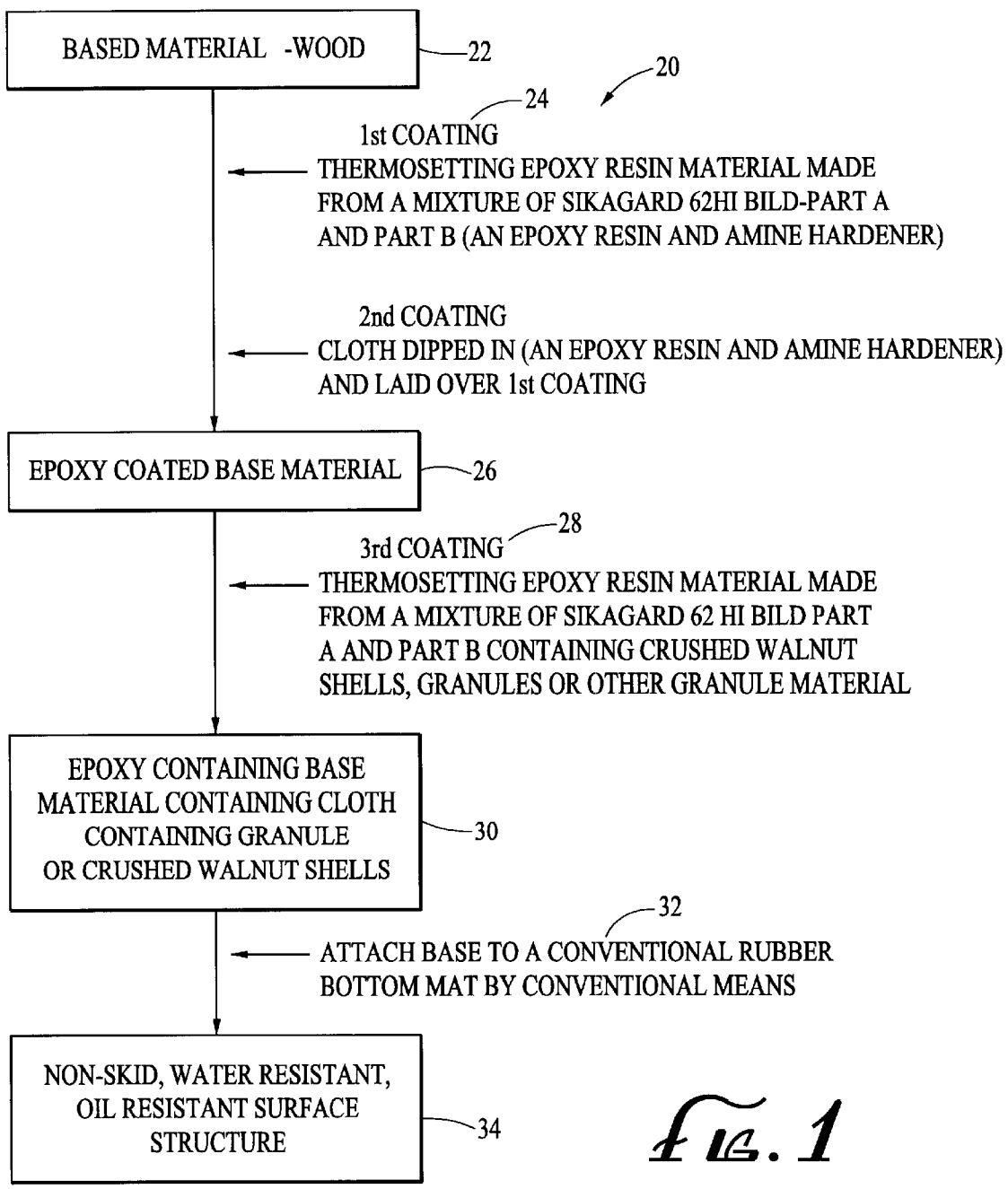
FIG. 1 is a schematic diagram of the method of manufacturing the surface structure of the present invention.

Referring to FIG. 1, a schematic diagram of the method of manufacture 20 of the surface structure of the present invention will be described. First, a substrate or sheet 22 is selected. Preferably the substrate is a wooden board or other durable, flat material. The substrate functions as a main supporting member and upon which and over which one or more layers of coating material are applied. Next, a first coating is applied at step 24. The $1^{st}$ coating is a mixture of SIKAGARD 62 HI BILD Part A and Part B thermosetting epoxy resin materials. The preferred coating for the mat of the present invention is an epoxy resin sold as SIKAGARD 62 HI BILD, which product includes a Part A epoxy compound, and a Part B amine curing agent, manufactured by the SIKA Corporation of Lindhurst, N.J. 07071. A copy of the SIKA Corporation product information sheet on its SIKAGARD 62 HI BILD product is incorporated by reference herein, and a copy is submitted herewith.

The Part A and Part B liquids are mixed in accordance with the instructions provided by the manufacturer. Once the SIKAGARD 62HI BILD mixture is prepared, the board is coated with the mixture. Then a section of a cloth of sufficient size to cover the board is then dipped in the SIKAGARD 62 HI BILD-Part A and Part B mixture. The mixture laden cloth is then laid on the board and permitted to dry, so that the coating hardens. The cloth is preferably a bedsheet-like material used to cover joints and nicks on the base material; it gives the base material a smoother finish and makes the epoxy resin bond stronger and harder to the coated base material, as shown in at 26 in FIG. 1.

Next, a third coating is applied in step 28. In this third coating, a third mixture of the SIKAGARD 62 HI BILD Part A and Part B is prepared, in accordance with the instructions from the manufacturer. Then, to this third mixture a quantity of crushed walnut shells or other granular material are added. In addition to crushed walnut shells, "SIKAGARD 62 granules" are preferred. SIKAGARD 62 granules are also commercially available from Sika Corporation. The granular material is mixed, preferably at a concentration of approximately ½ pound of granular material per gallon of the epoxy/amine mixture. The amount of granular material added may vary but must be at least enough to provide the function of yielding a non-slip surface in the finished product, but not so much granular material that the epoxy coating is unable to provide a coating that will adhere to the substrate. The mixture containing the granular material is then applied to the coated base material and the coating is allowed to dry and harden, thus forming a base material having two coatings, one of which contains SIKAGARD 62 HI BILD Part A and Part B, second one of which contains cloth dipped SIKAGARD 62 HI BILD Part A and Part B and a third one of which contains granular material, as shown at 30.

Once the three times coated board is dried, it is fastened to a conventional rubber-bottom structure or mat with an adhesive and/or conventional fasteners. Preferably, an adhesive commercially available and known as "Gorilla Glue" is used, as illustrated at 32 in FIG. 1. Once the coated substrate is attached to the rubber-bottomed mat, the non-skid, water resistant, oil resistant mat of the present invention results, as shown at 34. Other adhesives may be used in the present invention, so long as they function to adhere the coated substrate to the rubber-bottom structure or mat.

Figure 2:
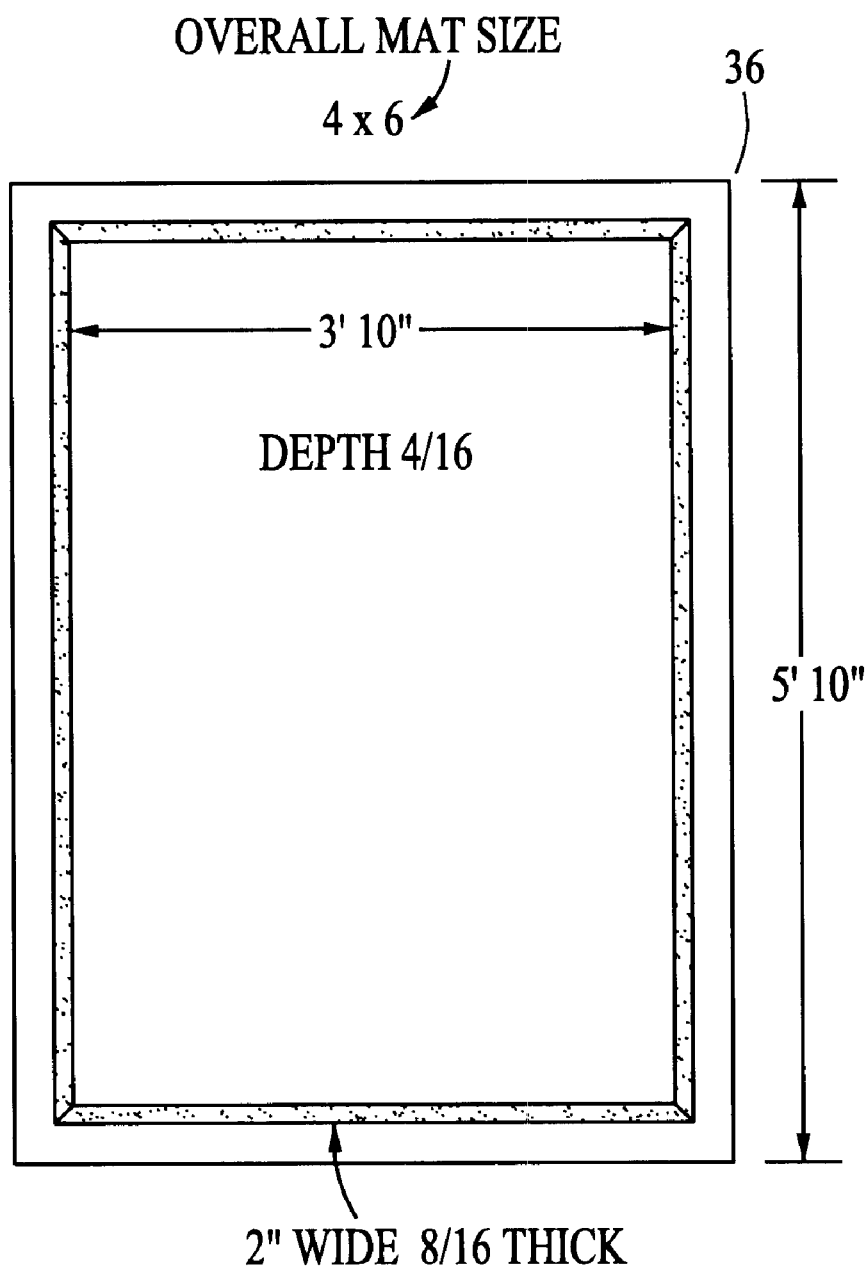
FIG. 2 is a top view of a first, preferred embodiment of the surface structure of the present invention.

With reference to FIG. 2, a first preferred embodiment of the finished surface structure 34 of the present invention is illustrated. In a first embodiment 36, the mat has an overall size of 4 feet by 6 feet, with a two-inch wide, 8 1/16 of an inch thick border as illustrated in FIG. 2. The center of the structure is approximately 3 feet, 1 inch across from the inside peripheries of the border. The depth of the structure below the top surface of the borders is 4/16 of an inch. The size, depth, width, length and thickness of the structure and its various components can vary, according to the particular application chosen. Such variances are within the skill of the art in this field.

Figure 3:
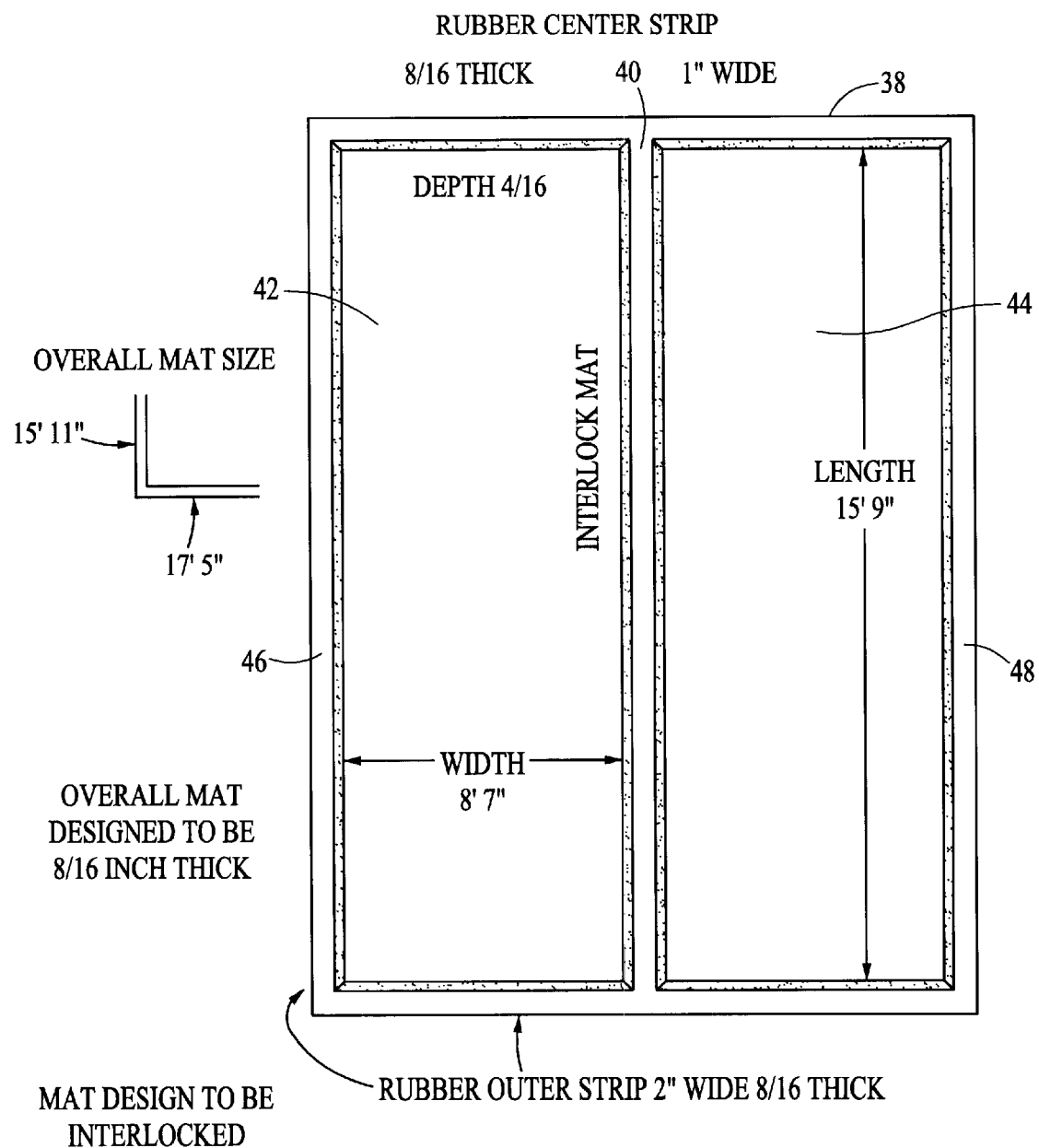
FIG. 3 is a is a top view of a second, preferred embodiment of the surface structure of the present invention.

With reference to FIG. 3, a second preferred embodiment 38 will be described. The mat 38 is a surface structure having a rubber center strip 40 and an overall size of approximately 15 feet, 11 inches by 17 feet, 5 inches. In the embodiment 38, a one inch wide, 8/16 of an inch thick rubber center strip 40 separates two sections of the structure 42 and 44, each of which has a rubber outer strip 46 and 48, respectively. These outer strips 46, 48 are each 2 inches wide and 8/16 of an inch thick, with a depth of 4/16 of an inch. Preferably the surface structure 38 is 8/16 of an inch thick and the sections 42 and 44 may be interlocked, in a conventional tongue-in-groove fashion, as is well-known.

As may be appreciated, one of the advantages of the present inventions is that a non-skid surface substrate may be easily manufactured to conform to the dimensions of commercially available rubber mats, and to thereby provide a non-skid function for such surface structures when used in locations where the presence of oil, water and other such liquids might cause a slippery surface.

As may be appreciated, and as believed to be within the capability of those skilled in this field, the mats can be made to have different shapes, colors and structures that provide for interlocking sections to each other and in various configurations. Also, although rubber is the preferred bottom material, other elastomeric materials may be used, so long as they are durable in the chosen environment and are able to be fastened to the created substrate.

The SIKAGARD 62 HI BILD, Part A is an epoxy resin, specifically epichlorohydrin/bisphenol. The SIKAGARD 62 HI BILD Part B amine-curing agent includes 2, 4, 6-tri (dimethylaminomethyl) phenol in a concentration of 5 ppm and is available in various colors. The composition also includes a proprietary blend of aliphatic and cyclic amines, coated precipitated calcium carbonate, amorphous silica and titanium dioxide. In the green colored product, chromium III oxide (2:3) is included in a concentration of 0.5 $mg/m^3$. The coated, precipitated calcium carbonate is in the range of 10 $mg/m^3$–5 $mg/m^3$. The amorphous silica is provided in a concentration of 20 mppcf to 10 $mg/m^3$, and the titanium dioxide is in a concentration of 10 $mg/m^3$ to 15 $mg/m^3$, except in the red colors.

It will be understood that certain features and subcombinations are of utility and may be employed without reference to other features and subcombinations as they are outlined within the description above and within the claims appended hereto. While the preferred embodiments and application of the invention have been described, it is apparent to those skilled in the art that the objects and features of the present invention are only limited as set forth in the claims appended hereto.

I claim:

1. A method of making a surface structure comprising:

selecting a base material made of wood and having a predetermined length, width and thickness;

applying a first coating of a thermosetting epoxy resin and an amine hardener to said base material;

applying a second coating including a cloth dipped in thermosetting epoxy resin laid on base material to provide a twice-coated base material;

permitting said twice-coated base material to dry and harden;

preparing a mixture of epoxy resin and amine hardener containing granular materials in an amount effective to form a roughened surface to form a third coating material when hardened;

applying the third coating material to the twice-coated base material;

permitting said third coating material to harden and dry to form a rough coated base; and attaching said rough coated base to a rubber-bottomed mat.

2. The method of claim 1 wherein the epoxy resin is epichlorohydrin/bisphenol.

3. The method of claim 1 wherein the amine hardener is 2, 4, 6-tri(dimethylaminomethyl)phenol.

4. The method of claim 1 wherein the granular material includes crushed walnut shells.

5. A surface structure comprising:

a rubber-bottomed mat adhered to a thrice-coated substrate;

the thrice-coated substrate having an epoxy resin based first coating, an epoxy resin based second coating including a cloth dipped in an epoxy resin laid over base first coating and an epoxy resin based third coating including a predetermined amount of granular material.

6. The surface structure of claim 5 wherein the rubber-bottomed mat is adhered to the substrate with a glue.

7. The surface structure of claim 5 wherein the substrate is made of wood.

8. The surface structure of claim 5 wherein the granular material includes crushed walnut shells.

9. The surface structure of claim 5 wherein the granular material is in a concentration of about ½ pound per gallon of the third coating.

10. The surface structure of claim 5 having a first section, a second section and a rubber strip separating the first section from the second section.

\* \* \* \* \*